Aug. 23, 1949.    O. L. GARRETSON ET AL    2,479,737
CYLINDER FILLING AND DISPENSING VALVE

Filed Feb. 25, 1946    2 Sheets-Sheet 1

INVENTORS
W.R. EDDY
O.L. GARRETSON
T.A. ST.CLAIR
BY Hudson & Young
ATTORNEYS

Aug. 23, 1949.   O. L. GARRETSON ET AL   2,479,737
CYLINDER FILLING AND DISPENSING VALVE

Filed Feb. 25, 1946   2 Sheets-Sheet 2

*INVENTORS*
*W. R. EDDY*
*O. L. GARRETSON*
*T. A. ST. CLAIR*

BY *Hudson & Young*

ATTORNEYS

Patented Aug. 23, 1949

2,479,737

UNITED STATES PATENT OFFICE 2,479,737

CYLINDER FILLING AND DISPENSING VALVE

Owen L. Garretson, William R. Eddy, and Theodore A. St. Clair, Bartlesville, Okla., assignors to Phillips Petroleum Company, a corporation of Delaware Application February 25, 1946, Serial No. 650,106

5 Claims. (Cl. 62—1)

This invention relates to a fitting containing a combination of valves and other elements useful in loading liquid petroleum gas into cylinders, either as a gas or liquid, but preferably as a liquid, and dispensing the same from said cylinder either as a liquid or gas, but preferably as a gas.

One object of the invention is to provide an improved combination of valves and other elements for use as a filling and dispensing fitting on a liquid petroleum gas containing cylinder.

Other objects are to provide strong and simplified structures adapted for use with a plurality of types of coupling attachments that will be rugged and foolproof in operation.

Numerous other objects and advantages will be apparent to those skilled in the art upon reading the accompanying specification, claims and drawings.

In the drawings

Figure 1:
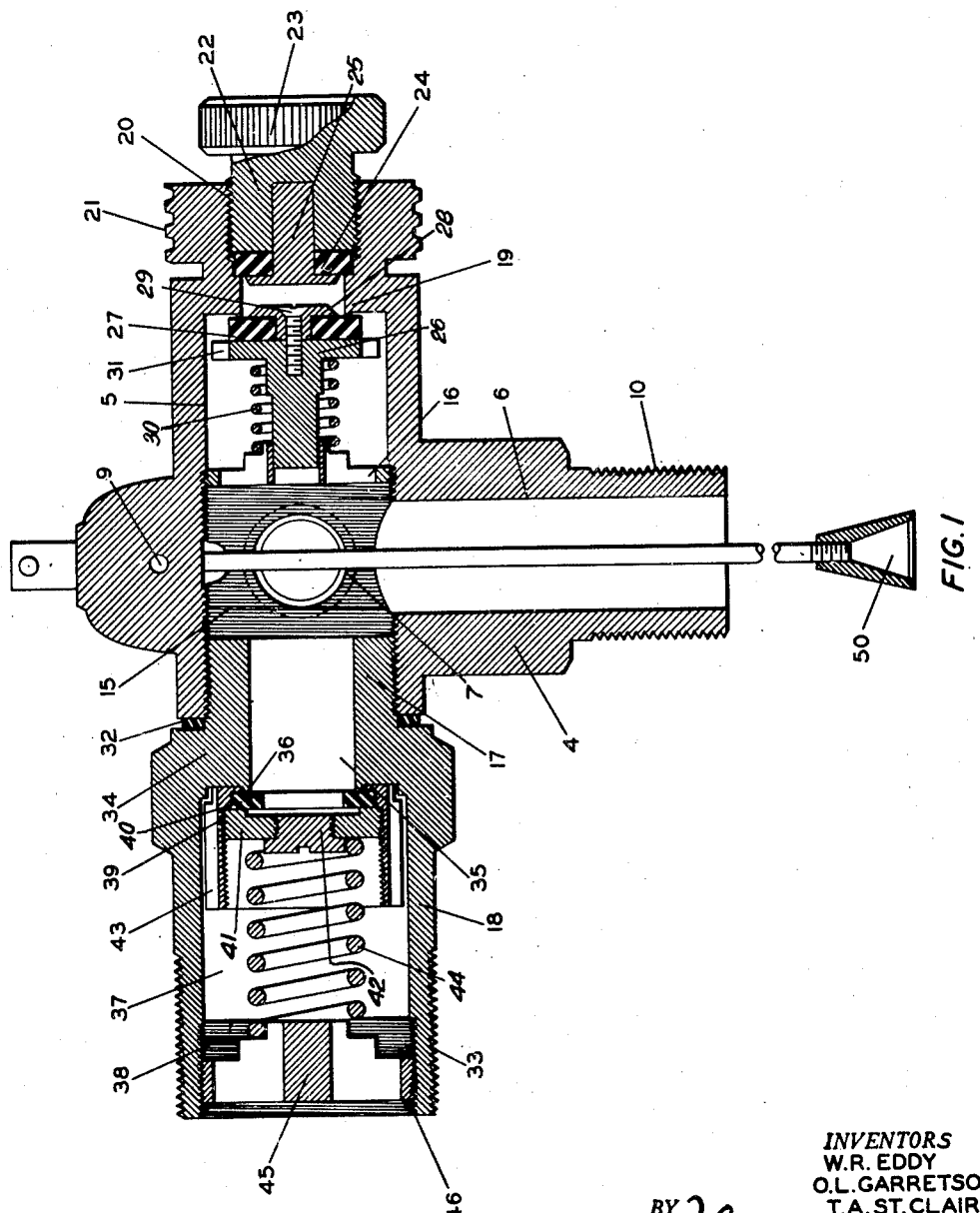
Figure 1 is an elevational, cross sectional view of a fitting embodying the present invention, which cross section is taken along the line 1—1 of Figure 3, looking in the direction of the arrows.

In Figure 1, the fitting is shown as comprising a body 4, having a main transverse bore 5 extending therethrough. A vertical or longitudinal bore 6 extends from bore 5 to the exterior of the lower portion of the body 4 and a third horizontal or transverse bore 7 extends from the exterior to also intersect bore 5.

Figure 2:
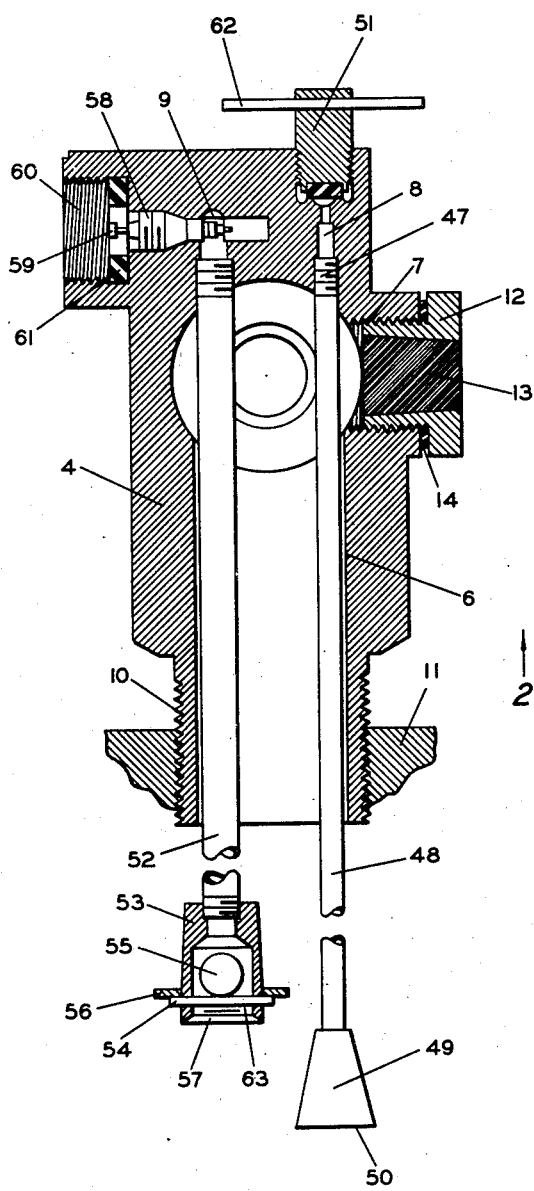
Figure 2 is a transverse elevational, cross sectional view of the same embodiment of the invention taken along the line 2—2 of Figure 3, looking in the direction of the arrows.
Figure 3:
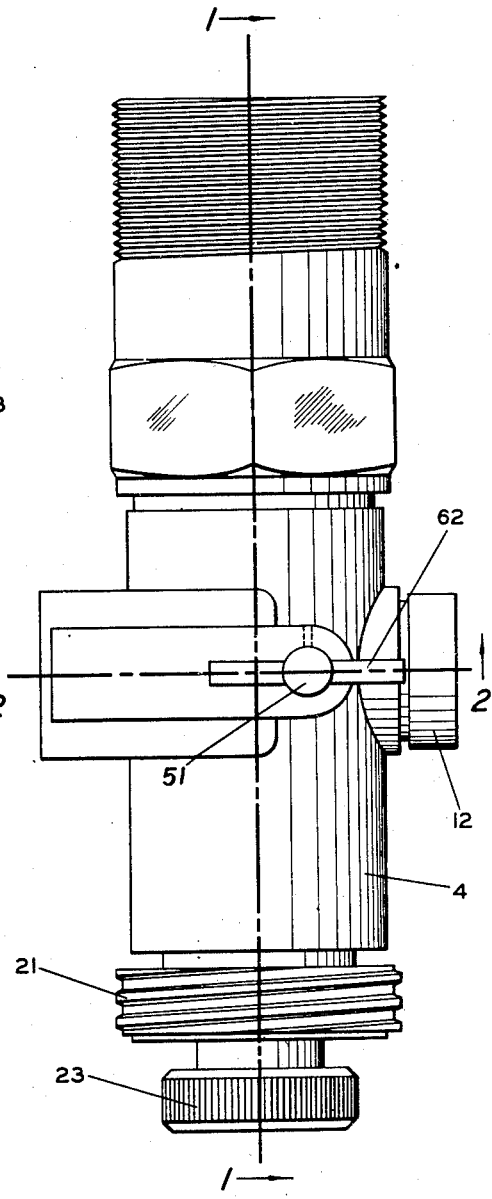
Figure 3 is a plan view showing the upper portion of the same embodiment of the invention as shown in Figures 1 and 2.

As shown in Figure 2, body 4 is also provided with bores 8 and 9 leading from bore 5 to the exterior of the body.

Body 4 is provided with external screw threads 10 for attachment to a cylinder containing liquid petroleum gas, a portion of which is shown at 11. Obviously, the portion 11 may be an integral part of the cylinder or a sleeve welded or otherwise secured to the cylinder, and the exact form of external screw threads 10 is relatively unimportant although external threads are preferred in order to avoid restricting the bore 6, but obviously by increasing the diameter of body 4 at the region occupied by external screw threads 10 and recessing the interior, internal threads could be employed in place of external screw threads 10 without restricting bore 6.

At least a portion of bore 7 is screw threaded to receive a filler element 12 containing a plug 13 of fusible metal which will melt and blow out when dangerously high temperatures occur. A gasket 14 may be provided to obviate leakage.

Bore 5 is provided with a long internally threaded portion 15 for receiving spider 16 and the threaded extension 17 of safety valve housing 18. Bore 5 contains a valve seat 19 having a sharp inwardly directed rim directed to the left side of Figure 1 and a square face or shoulder directed to the right side. Bore 5 then continues with internal left hand threads 20. The exterior of body 4 at that point is preferably provided with square type threads such as the Acme threads 21. Bore 5 is closed at the region occupied by left hand threads 20 by a filler element 22 preferably provided with a milled knob 23 and carrying a resilient valve head 24 secured thereto by pin 25 having a drive fit in the filler element 22. Thus the filler element 22 may removably close bore 5.

Also closing bore 5 is a spring pressed check valve having a valve head 26 carrying a resilient sealing member 27 secured in place by metallic washer 28 and screw 29. Head 26 is urged against seat 19 by spring 30 and the valve is held in place by spider 16 screw threaded in threads 15 of bore 5. Head 26 has guide arms 31 and has a sliding fit at spider 16.

A relief valve is carried by valve housing 18 which is threaded into threaded portion 15 at extension 17 and may be provided with a sealing gasket 32. Valve housing 18 may be provided with external threads 33 for attachment to a stack or other vent means for relief gases. However, the stack is not necessary in many instances especially where the entire assembly is in the open air. Valve housing 18 has a valve seat 34 controlling bore 35. Valve seat 34 has a sharp annular edge 36.

Bore 35 has an outer enlarged portion 37 which is provided with threads 38. Relief valve head 39 is provided with a resilient sealing washer 40 retained between head 39 and filler element 41. Filler element 41 may be provided with a fusible plug insert 42 to supplement fusible plug 13. However, filler element 41 and plug insert 42 may be integral and substantially non-fusible, if desired. Head 39 is non-circular and has guiding fins or ridges 43 (which guide the head but allow free passage of gas) and is urged to its seat by spring 44 which in turn is held in place by spider 45. One way to provide ridges 43 is merely to make valve head 39 polygonal in cross section. Spider 45 is preferably secured to valve housing 18 by threads 38 and solder 46. The relief valve is described and claimed as an individual unit in the copending application of Owen L. Garretson, Serial No. 50,105, filed September 20, 1948, entitled "Relief valve."

As best shown in Figure 2, bore 8 is screw threaded at 47 to receive tube 48. Tube 48 has a deflector 49 which also has the function of increasing the size of the interior of tube 48 to a large area at mouth 50, to avoid premature entrainment of liquid. The upper part of bore 8 is provided with a valve seat closed by externally threaded insert 51. Bore 9 is threaded to receive tube 52 containing excess flow valve fitting 53.

Excess flow valve fitting 53 has a pin 54 retaining ball 55 inside of fitting 53. Ball 55 normally rests on pin 54, but if excessive flow in fitting 53 occurs, ball 55 will rise and close tube 52. A deflecting plate 56 rests on pin 54 (for purposes to be described later) and the mouth 57 of fitting 53 is large enough to obviate entrainment of liquid. Bore 9 is provided with a valve 58 which is preferably of the common tire core valve type having a pin 59 for engagement by an opening device. Normally valve 58 is closed by a spring urging the valve shut and urging pin 59 toward the left side of the joint. Any suitable connecting means may be employed on body 4 such as screw threads 60 and packing 61 may be provided, it being noted that packing 61 is retained in place by screw threads 60, being compressed to press through the screw threads and then expanding into position shown.

Insert 51 may be provided with a turning bar 62 and fitting 53 may be provided with screw threads 63.

Operation

Body 4 is attached by such means as threads 10 to cylinder 11, which is adapted to receive liquid petroleum gas. It will be noted that relief valve head 39, filler element 12, insert 51, valve head 26, filler element 22 and valve 58 close all the available openings in the fitting, while ball 55 rests on pin 54. The length of tube 48 depends on the height to which it is deemed safe to fill the cylinder with liquid petroleum gas and mouth 50 is positioned at the exact level desired. Obviously some gas space must be left above the liquid or there will be undue stresses set up upon expansion of the liquid due to temperature changes.

If it is proposed to dispense gas from the cylinder, tube 52 is chosen of a length shorter than tube 48 so that mouth 57 is above mouth 50; on the other hand if it is desired to dispense liquid, tube 52 is extended so that mouth 57 is below mouth 50, and obviously then mouth 57 should be as close to the bottom of the cylinder as may be convenient.

When dispensing gas it is preferred, however, to have fitting 53 spaced a little below the end of body 4 so that it will not act to unduly constrict bore 7 during the filling of the cylinder with liquid.

While it is possible to pump gas into a cylinder and even have it condense therein, such operations are impractical commercially when compared to filling the cylinder with liquefied gas. Therefore the filling will be described as filling with liquid with the understanding that gas filling could be employed.

The operator unscrews filler element 22 and insert 51. A liquid filling line is attached by means of left hand thread 20 or Acme thread 21, depending upon the type of filling connection employed. The left hand thread 20 is preferred in the P. O. L. filling system because of safety reasons while the Acme thread 21 is preferred in the newer filling system because an external thread gives greater filling capacity and because it provides quick connection. By having both, the filling hoses of either system may be employed.

In either instance the filling line either has a member which engages washer 28 and pushes valve head 26 open which is preferred, or else provides liquid petroleum gas under sufficient pressure to force valve head 26 open. In either instance the liquefied gas proceeds through bores 5 and 6 down into the cylinder striking deflector plate 56 and spraying through the gas in the cylinder to cool the same.

This is an important feature of the invention because it has been found in the prior art that as the liquid fills the cylinder the gas above the liquid is compressed and unduly heated by the compression. This high temperature gas has abnormally high pressure which is dangerous and may cause the operation of the relief valve head 39. By cooling the gas with liquid deflected from plate 56 the gas does not become hot and the pressure inside the cylinder remains normal.

As the liquid fills the cylinder it finally reaches mouth 50. Up until this time substantially invisible gas has been blowing out of bore 8 in a small stream and entrainment of liquid has been prevented by deflector 49 and the large area with its resulting slow velocity of gas at mouth 50. As the liquid reaches mouth 50 the stream of fluid in tube 48 suddenly changes from gas to liquid and the operator sees a white cloud of liquid spray coming out bore 8. The operator immediately stops filling liquid and closes bore 8 with insert 51.

When tube 52 is extended low enough to withdraw liquid, then it is no longer necessary to have large mouth 57 to avoid entrainment of liquid by lowering the velocity of flow and in order to keep deflector plate 56 out in the gas space it is sometimes desirable to attach an extension (not shown) to tube 52 to threads 63 shown in the interior of fitting 53, this extension extending down into the liquid as an eduction tube.

The eduction of fluid through tube 52 is independent of the filling operation through bore 5, because it is not desired to interrupt gas service to stoves or other appliances during filling. The dispensing line is connected at the screw threads 60, said dispensing line (not shown) having a member depressing pin 59 and opening valve 58. As long as a normal supply of fluid is being drawn through tube 52 ball 55 remains open as shown, but if an excess flow occurs due to a broken pipe, or other disconnections, then ball 55 will close tube 52. During normal flow, the velocity of fluid through large mouth 57 is too low to entrain any substantial amount of liquid, even though liquid is being pumped in bore 5 and is being deflected by deflector plate 56.

The operation of fusible plug 13, and of fusible plug 42 (if present), is simply that if an excessive temperature occurs the fusible metal will melt and allow escape of gas. When the pressure in bore 5 is greater than that impressed on valve head 39 by spring 44, the valve head is raised to relieve the pressure.

The novel construction of valve head 39 results in an improved operation of the same, especially with relation to the differences in relief valve seatings as to pressure causing initial leak, full opening and reseat of valve head 39. As shown valve head 39 has a resilient washer 40 with an opening through its center and filler element 41 has a recess portion allowing gas in bore 35 to get back between filler element 41 and washer 40 to equalize the pressure at that point and in bore 35. This results in the gas between filler element 41 and resilient sealing washer 40 tending to force resilient sealing washer 40 against the sharp annular edge 36 of valve seat 34. The greater the pressure difference between bore 35 and the atmosphere communicating with enlarged portion 37 the more firmly the washer 40 will be urged against sharp annular edge 36.

Comparing the results obtained with the same size and type of valve set for 375 pounds when a solid disc is used in place of washer 40 and when washer 40 is employed as shown, the following relief valve seating pressures are observed:

|  | With Annular Washer 40 | | With A Disc In Place of Annular Washer 40 | |
|---|---|---|---|---|
|  | New Valve | After 6 Months | New Valve | After 6 Months |
| Initial Leak | 375 | 381 | 390 | 450 |
| Full Opening | 381 | 389 | 410 | 485 |
| Reseat Minimum | 372 | 361 | 325 | 285 |

These values are average values of groups of valves tested.

It will therefore, be evident that the relief valve shown is an improvement over those of the prior art and is preferable for use with liquid petroleum gas because there is less leakage before the relief pressure is reached and quicker closing of the valve when a safe pressure is again obtained. The range of pressure from full opening to reseat with the annular washer is only one tenth of that with the disc. The relief of an inflammable liquid petroleum gas is the lesser of two evils, the other evil being the bursting of the tank. Therefore, the less gas vented in order to keep the tank pressure at a safe value the more valuable the relief valve is for use with liquid petroleum gas equipment.

When the filling line is removed, valve head 26 closes automatically and filler element 22 is reinserted for additional safety and for protection of valve head 26.

It is to be understood that the form of this invention, herewith shown and described, is to be taken as a preferred example of the same, and that various changes in the shape, size, and arrangements of parts may be resorted to, without departing from the spirit of the invention, or the scope of the subjoined claims.

Having described our invention, we claim:

1. A cylinder filling and dispensing valve comprising in combination a body having a T shaped bore, having internal screw threads extending through a first arm of the T bore and into a second arm aligned therewith, a filling check valve comprising a seat formed in the body around said second arm of the bore and a valve head movable in said bore, a spider threaded into the screw threads in said second arm, and a spring between said spider and said head, said body having a thermal relief bore communicating between the atmosphere and said T shaped bore, a fusible plug closing said third bore, a fluid eduction conduit passing through said T bore, an excess flow valve in the end of said eduction conduit spaced outside of said body, a liquid level conduit passing through said T bore having an enlarged end to prevent premature entrainment of liquid spaced outside of said body, and a pressure relief valve controlling flow through said first arm.

2. A cylinder filling and dispensing valve comprising in combination a body having a T shaped bore, having a first arm and a second arm aligned therewith, a filling check valve comprising a seat formed in the body around said second arm of the bore and a valve head movable in said bore, a spider in said second arm, and a spring between said spider and said head, a fluid eduction conduit passing through said T bore, an excess flow valve in the end of said eduction conduit spaced outside of said body, a liquid level conduit passing through said T bore having an enlarged end to prevent premature entrainment of liquid spaced outside of said body, and a pressure relief valve controlling flow through said first arm.

3. A cylinder filling and dispensing valve comprising in combination a body having a T shaped bore, having internal screw threads extending through a first arm of the T bore and into a second arm aligned therewith, a filling check valve comprising a seat formed in the body around said second arm of the bore and a valve head movable in said bore, a spider threaded into the screw threads in said second arm, and a spring between said spider and said head, said body having a thermal relief bore communicating between the atmosphere and said T shaped bore, a fusible plug closing said third bore, a fluid eduction conduit passing through said T bore, and a pressure relief valve controlling flow through said first arm.

4. A cylinder filling and dispensing valve comprising in combination a body having a T shaped bore, having a first arm and a second arm aligned therewith, a filling check valve comprising a seat formed in the body around said second arm of the bore and a valve head movable in said bore, a spider in said second arm, and a spring between said spider and said head, said body having a thermal relief bore communicating between the atmosphere and said T shaped bore, a fusible plug closing said third bore, a fluid eduction conduit passing through said T bore, a liquid level conduit passing through said T bore having an enlarged end to prevent premature entrainment of liquid spaced outside of said body, and a pressure relief valve controlling flow through said first arm.

5. A cylinder filling and dispensing valve comprising in combination a body having a T shaped bore, having internal screw threads extending through a first arm of the T bore and into a second arm aligned therewith, a filling check valve comprising a seat formed in the body around said second arm of the bore and a valve head movable in said bore, a spider threaded into the screw threads in said second arm, and a spring between said spider and said head, a fluid eduction conduit passing through said T bore, an excess flow valve in the end of said eduction conduit spaced outside of said body, and a pressure relief valve controlling flow through said first arm.

OWEN L. GARRETSON.
WILLIAM R. EDDY.
THEODORE A. ST. CLAIR.

REFERENCES CITED

The following references are of record in the file of this patent:

UNITED STATES PATENTS

| Number | Name | Date |
|---|---|---|
| 2,107,704 | Kronguest | Feb. 8, 1938 |
| 2,172,311 | Thomas | Sept. 5, 1939 |
| 2,176,829 | White | Oct. 17, 1939 |
| 2,254,209 | Buttner | Sept. 2, 1941 |
| 2,341,579 | Sundstrom | Feb. 15, 1944 |
| 2,440,230 | Buttner | Apr. 20, 1948 |